United States Patent
Thompson et al.

(10) Patent No.: US 6,679,965 B1
(45) Date of Patent: Jan. 20, 2004

(54) LOW DENSITY COMPOSITE ROCKET NOZZLE COMPONENTS AND PROCESS FOR MAKING THE SAME FROM STANDARD DENSITY PHENOLIC MATRIX, FIBER REINFORCED MATERIALS

(75) Inventors: Allan P. Thompson, Brigham City, UT (US); John K. Shigley, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 717 days.

(21) Appl. No.: 09/090,256

(22) Filed: Jun. 4, 1998

Related U.S. Application Data

(60) Provisional application No. 60/048,672, filed on Jun. 5, 1997, provisional application No. 60/048,604, filed on Jun. 4, 1997, and provisional application No. 60/048,605, filed on Jun. 4, 1997.

(51) Int. Cl.$^7$ .......................... B32B 31/00; B32B 31/02; B32B 27/04
(52) U.S. Cl. .......................... 156/184; 156/77; 264/257; 264/510; 264/511; 264/512; 428/308.4
(58) Field of Search .................. 264/257, 510, 264/511, 512, 51; 428/308.4; 156/77, 184

(56) References Cited

U.S. PATENT DOCUMENTS

| | | | |
|---|---|---|---|
| 3,293,860 A | | 12/1966 | Stedfeld |
| 3,634,130 A | * | 1/1972 | Long et al. ................. 117/121 |
| 3,891,489 A | | 6/1975 | Bordner et al. |
| 4,065,340 A | | 12/1977 | Dickerson |
| 4,104,340 A | | 8/1978 | Ward |
| 4,182,495 A | * | 1/1980 | Borgmeier et al. .... 239/265.11 |
| 4,268,320 A | | 5/1981 | Klingaman et al. |
| 4,294,750 A | | 10/1981 | Klingaman et al. |
| 4,323,623 A | | 4/1982 | Ahrens et al. |
| 4,327,885 A | * | 5/1982 | Blevins et al. ............. 244/3.24 |
| 4,621,024 A | | 11/1986 | Wright |
| 4,624,885 A | | 11/1986 | Mumford et al. |
| 4,643,940 A | * | 2/1987 | Shaw et al. .............. 428/308.4 |
| 4,670,331 A | | 6/1987 | Radvan et al. |
| 4,842,923 A | * | 6/1989 | Hartman ..................... 428/219 |
| 5,082,918 A | * | 1/1992 | Boinot et al. ................ 528/140 |
| 5,106,568 A | * | 4/1992 | Honka ......................... 246/510 |
| 5,242,720 A | * | 9/1993 | Blake ......................... 428/34.5 |
| 5,280,706 A | | 1/1994 | Yorgason |
| 5,312,579 A | | 5/1994 | Druyun et al. |
| 5,340,625 A | * | 8/1994 | Weitsman et al. ......... 428/36.3 |
| 5,345,397 A | * | 9/1994 | Handel et al. .............. 364/503 |
| 5,397,630 A | | 3/1995 | Kim et al. |
| 5,417,792 A | | 5/1995 | Scola et al. |

FOREIGN PATENT DOCUMENTS

| | | |
|---|---|---|
| EP | 669153 A1 | 10/1994 |
| JP | 62028230 | 2/1987 |
| WO | 90/03880 | 4/1990 |

* cited by examiner

Primary Examiner—Richard Crispino
Assistant Examiner—Sue A. Purvis
(74) Attorney, Agent, or Firm—TraskBritt

(57) ABSTRACT

A process for producing low-density composite components as disclosed herein involves forming a compacted and curable pre-preg into a selected level of compaction whereby voids are capable of forming in the compacted cuable pre-preg. The compacted curable pre-preg is then cured at a pressure sufficiently low to permit evolving gases to form voids in the pre-preg as the pre-preg cures into the composite article. The pre-preg is only partially debulked in the process. Rocket nozzle components can be produced with reduced densities while still exhibiting satisfactory erosion and other characteristics desired for products subject to the harsh erosive environment of a rocket motor.

31 Claims, 17 Drawing Sheets

A. A wrap mandrel is placed in the machine (a wrap machine looks much like a lathe).
B. The tape application roller is set parallel to the wrapping surface of the mandrel.
C. Tape is fed across the surface of the application roller
  • Pre-preg tape is heated with hot air as it crosses over the roller to soften the tape.
  • Pressure is applied through the roller to debulk the tape onto the wrap mandrel.
  • CO₂ from a liquid holding tank is applied to cool and harden the debulked tape.

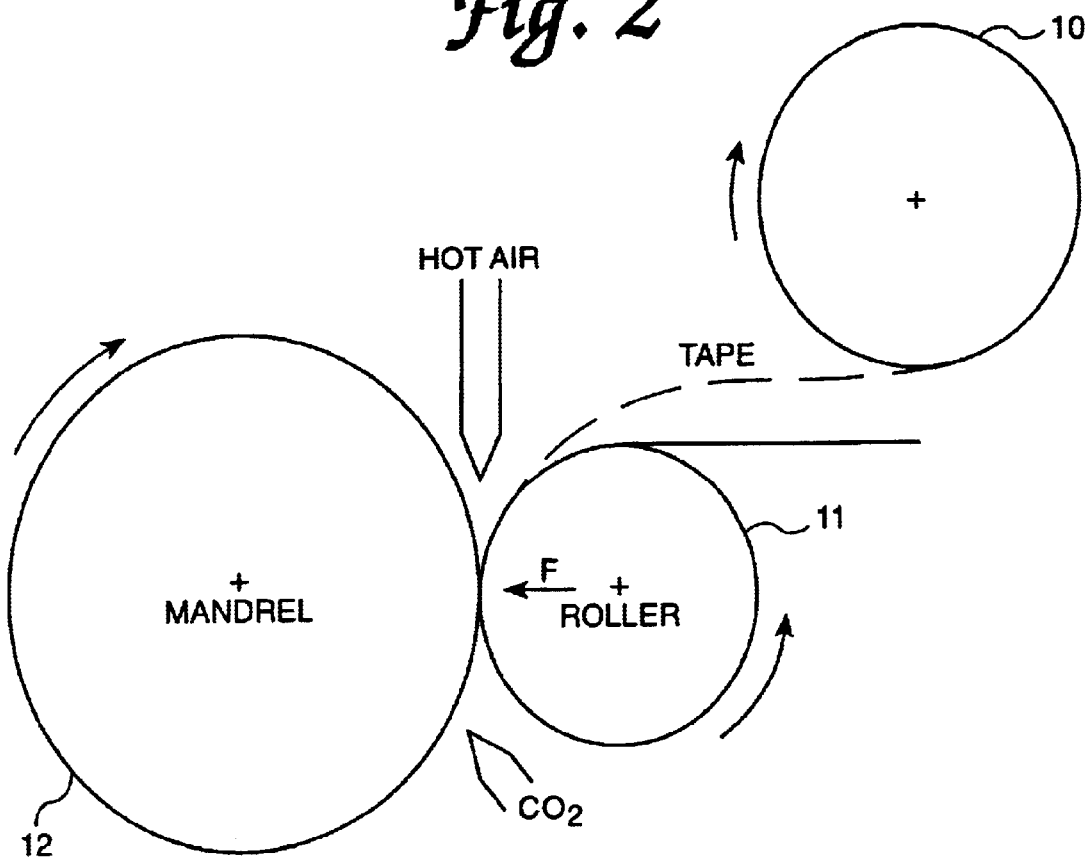

Fig. 2

A. A wrap mandrel is placed in the machine (a wrap machine looks much like a lathe).

B. The tape application roller is set parallel to the wrapping surface of the mandrel.

C. Tape is fed across the surface of the application roller

- Pre-preg tape is heated with hot air as it crosses over the roller to soften the tape.
- Pressure is applied through the roller to debulk the tape onto the wrap mandrel.
- $CO_2$ from a liquid holding tank is applied to cool and harden the debulked tape.

Fig. 3

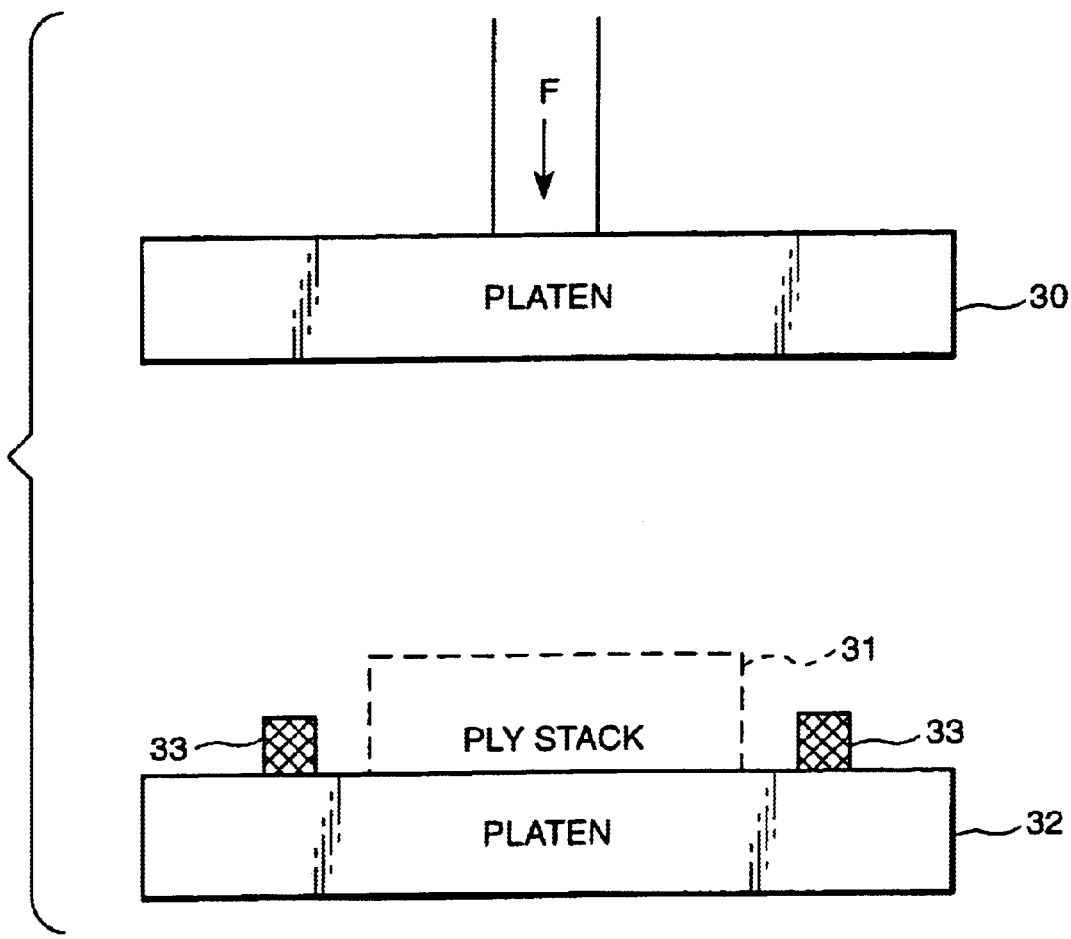

A. A stack of plies is placed in the heated platen press for debulk.
- Platen are warmed to 130 - 150°F to soften pre-preg.
- Stops are set to restrict platen travel and to achieve desired debulked ply thickness.

B. Press platen are closed to stops and held at temperature for 20 min.

C. Debulked stacks are cooled to room temperature before opening platen.

D. Debulked stacks are stacked to form entire billet.

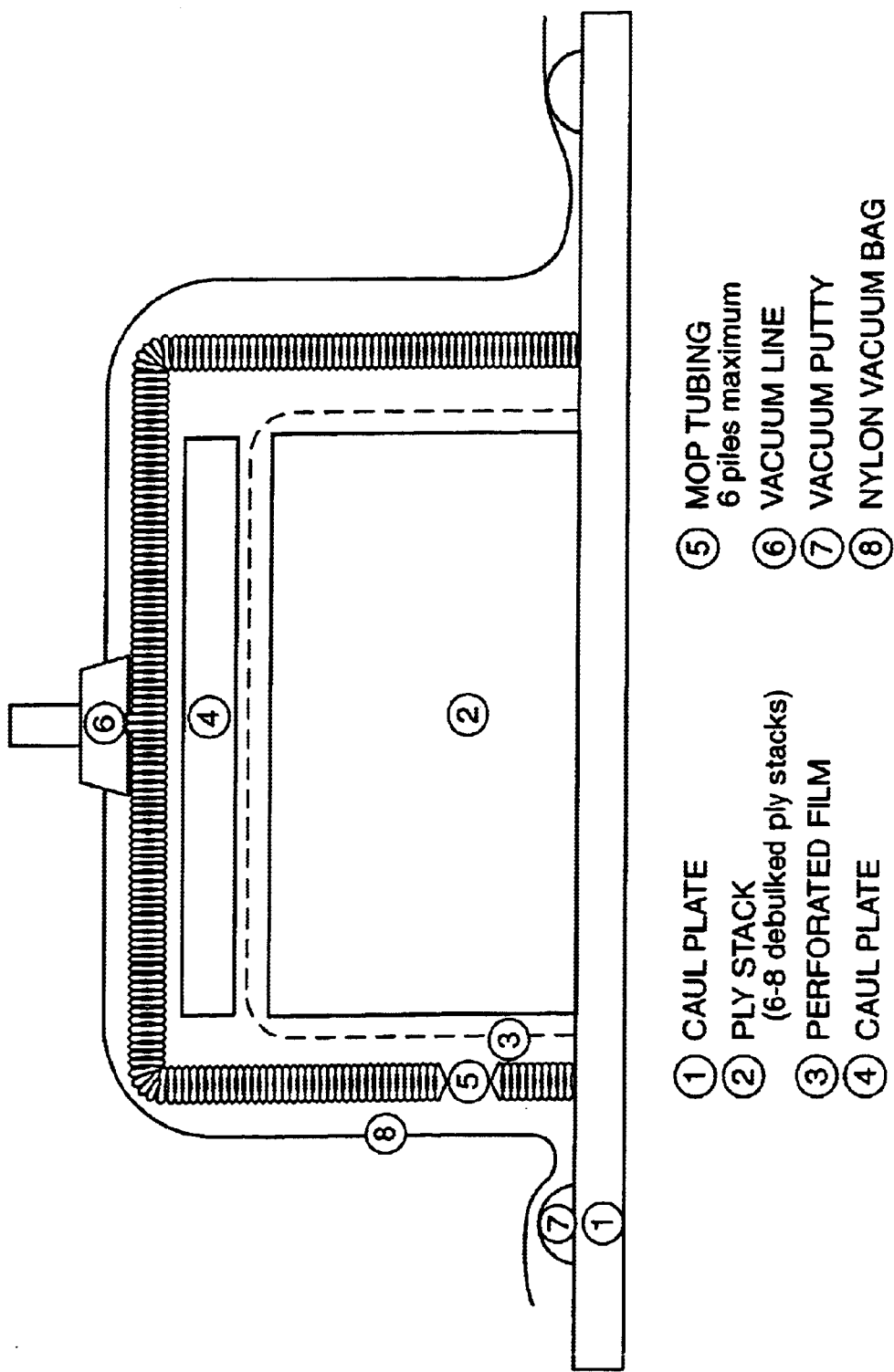

| Component | Motor | Material | Norm. Erosion, mils/s | Norm. Char. inches | Total Heat Affected Depth, inches |
|---|---|---|---|---|---|
| Blast Tube-Aft | MPCE-1 | MX-4946 | 2.39 | 0.409 | 0.493 |
| | MPCE-2 | MX-4926 VC | 7.59 | 0.268 | 0.534 |
| | MPCE-3 | MX-4920 VC | 6.18 | 0.464 | 0.680 |
| | MPCE-4 | UF MX-134 LDR (1.2) | 11.03 | 0.234 | 0.620 |
| | MPCE-5 | UF MX-4920 | 5.32 | 0.483 | 0.669 |
| | MPCE-6a | FM-32800 LD/LF | 12.18 | 0.255 | 0.681 |
| | MPCE-6b | MX-4955 | 8.65 | 0.398 | 0.701 |
| | MPCE-7 | MX-4946 VC | 6.10 | 0.386 | 0.599 |
| | MEAN | MX-4926 | 7.25 | 0.283 | 0.537 |
| Blast Tube-Mid | MPCE-1 | MX-4946 | 9.32 | 0.464 | 0.790 |
| | MPCE-2 | MX-4926 VC | 10.49 | 0.301 | 0.668 |
| | MPCE-3 | MX-4920 VC | 6.56 | 0.761 | 0.991 |
| | MPCE-4 | UF MX-134 LDR (1.2) | 15.60 | 0.299 | 0.845 |
| | MPCE-5 | UF MX-4920 | 9.28 | 0.582 | 0.907 |
| | MPCE-6 | FM-32800 LD | 13.97 | 0.205 | 0.694 |
| | MPCE-7 | MX-4946 VC | 8.22 | 0.496 | 0.784 |
| Blast Tube-Fwd | MPCE-1 | MX-4946, 45 | 5.88 | 0.278 | 0.484 |
| | MPCE-2 | | 7.30 | 0.246 | 0.502 |
| | MPCE-3 | | 6.16 | 0.319 | 0.535 |
| | MPCE-4 | | 7.67 | 0.244 | 0.512 |
| | MPCE-5 | | 7.71 | 0.322 | 0.592 |
| | MPCE-6 | | 9.16 | 0.283 | 0.604 |
| | MPCE-7 | | 6.90 | 0.288 | 0.530 |
| | MEAN | MX-4926 | 7.25 | 0.283 | 0.537 |
| Throat | Typical | 4D C/C, 1.95 gm/cc | 2.50 | | |
| | MPCE-1 | 4D C/C, 1.90 gm/cc | 1.20 | | |
| | MPCE-2 | RTM'd 4D C/C, 1.75 gm/cc | 6.12 | | |
| | MPCE-3 | Compolent Hf/2W | 0.81 | | |
| | MPCE-4 | 2D C/C Brake, 1.87 gm/cc | 3.98 | | |

Fig. 6A

| Component | Motor | Material | Norm. Erosion, mils/s | Norm. Char. inches | Total Heat Affected Depth, inches |
|---|---|---|---|---|---|
| Throat | MPCE-5 | HfC on Poco Graphite | 7.26 | | |
| | MPCE-6 | ZIRCONIUM DIBORIDE | 7.76 | | |
| | MPCE-7 | Insitu C/C by PL RD | 5.01 | | |
| Throat Inlet | MPCE-1 | MX-4926, 90 | 6.73 | 0.341 | 0.543 |
| | MPCE-2 | | 9.94 | 0.364 | 0.678 |
| | MPCE-3 | | 8.97 | 0.562 | 0.896 |
| | MPCE-4 | | 7.50 | 0.617 | 1.033 |
| | MPCE-5 | | 11.90 | 0.700 | 0.963 |
| | MPCE-6 | | 8.76 | 0.330 | 0.589 |
| | MPCE-7 | | 7.41 | | |
| Forward Exit Cone | MPCE-1 | MX-4946, 45 | 4.24 | 0.216 | 0.364 |
| | MPCE-2 | | 4.00 | 0.260 | 0.400 |
| | MPCE-3 | | 12.74 | 0.216 | 0.682 |
| | MPCE-4 | | 4.62 | 0.211 | 0.350 |
| | MPCE-5 | | 3.72 | 0.340 | 0.430 |
| | MPCE-6 | | 4.73 | 0.190 | 0.356 |
| | MPCE-7 | | 3.42 | 0.297 | 0.417 |
| Aft Exit Cone | C4-7 | MX-4946 | 7.65 | 0.295 | 0.563 |
| | MPCE-1 | MX-4926 | 4.22 | 0.193 | 0.341 |
| | MPCE-2a | MX-4920 VC | 3.05 | 0.219 | 0.326 |
| | MPCE-2b | MX-4926 VC | 5.42 | 0.269 | 0.459 |
| | MPCE-3a | UF MX-4920 VC | 6.73 | 0.254 | 0.677 |
| | | UF MX-4920 | 6.37 | 0.292 | 0.991 |
| | MPCE-4a | UF MX-134 LDR (1.2) | 4.54 | 0.272 | 0.431 |
| | MPCE-4b | UF MX-4920 VC & PC | 4.57 | 0.344 | 0.504 |
| | MPCE-5a | FM-32800 LD/LF | 4.11 | 0.285 | 0.429 |
| | MPCE-5b | UF MX-134 LDR (1.2) PC | 4.15 | 0.258 | 0.400 |
| | MPCE-6a | MX-4926 VC & PC | 4.94 | 0.352 | 0.525 |
| | MDCE-6b | FM-32800 LD/LF PC | 4.93 | 0.270 | 0.443 |
| | MPCE-7a | MX-4955 VC | 3.24 | 0.420 | 0.534 |
| | MPCE-7b | MX-4946 VC | 3.42 | 0.360 | 0.484 |

| Location | Motor | Material | Bulk Density, gm/cc | Specific Gravity | Residual Volatiles, wt% | Resin Content, wt% | Compressive Strength, psi | Norm. Erosion mils/s | Norm. Char, inches | Thad, inches |
|---|---|---|---|---|---|---|---|---|---|---|
| Blast Tube, 45 | MPCE-1 | MX-4946 | 1.495 | 1.525 | 2.14 | 31.29 | 21379 | 2.39 | 0.409 | 0.493 |
| | MPCE-2 | MX-4926 VC | 1.142 | 1.167 | 2.27 | 33.04 | 19749 | 7.59 | 0.268 | 0.534 |
| | MPCE-3 | MX-4920 VC | 1.383 | 1.434 | 0.30 | 27.18 | 23067 | 6.18 | 0.464 | 0.680 |
| | MPCE-4 | UF MX-134 LDR | 1.211 | 1.241 | 1.81 | 41.48 | 18520 | 11.03 | 0.234 | 0.620 |
| | MPCE-5 | UF MX-4920 | 1.454 | 1.496 | 1.94 | 33.23 | 17057 | 5.32 | 0.483 | 0.669 |
| | MPCE-6 | FM-32800 LD/LF | 1.193 | 1.227 | 1.00 | 29.36 | 17132 | 12.18 | 0.255 | 0.681 |
| | | FM-32800 LD | 1.184 | 1.216 | 1.52 | 30.65 | 27134 | 13.97 | 0.205 | 0.694 |
| | | MX-4955 | 1.510 | 1.547 | 2.53 | 27.95 | 13922 | 8.65 | 0.398 | 0.701 |
| | MPCE-7 | MX-4946 VC | 1.374 | 1.440 | 0.67 | 35.68 | 29802 | 6.10 | 0.386 | 0.599 |
| | MPCE-1,2,3 | MX-4926 | 1.449 | 1.478 | 0.68 | 35.65 | 41850 | | | |
| | MPCE 4 - 7 | MX-4926 | 1.458 | 1.487 | 0.88 | 36.29 | | | | |
| | | | | | | | | | | |
| Blast Tube, 90 | | Mean | 1.454 | 1.484 | 0.78 | 35.97 | 41850 | 7.25 | 0.283 | 0.537 |
| | MPCE-1 | MX-4946 | 1.510 | 1.538 | 2.06 | 30.63 | 22546 | 9.32 | 0.464 | 0.790 |
| | MPCE-2 | MX-4926 VC | 1.142 | 1.176 | 0.80 | 32.01 | | 10.49 | 0.301 | 0.668 |
| | MPCE-3 | MX-4920 VC | 1.411 | 1.455 | 0.48 | 27.95 | 28732 | 6.56 | 0.761 | 0.991 |
| | MPCE-4 | UF MX-134 LDR | 1.207 | 1.239 | 1.83 | 41.19 | 22119 | 15.60 | 0.299 | 0.845 |
| | MPCE-5 | UF MX-4920 | 1.459 | 1.503 | 1.93 | 31.72 | 21108 | 9.28 | 0.582 | 0.907 |
| | MPCE-7 | MX-4946 VC | 1.406 | 1.439 | 1.99 | 32.72 | 27145 | 8.22 | 0.496 | 0.784 |

Fig. 10B

| Location | Motor | Material | Bulk Density, gm/cc | Specific Gravity | Residual Volatiles, wt% | Resin Content, wt% | Compressive Strength, psi | Norm. Erosion mils/s | Norm. Char, inches | Thad, inches |
|---|---|---|---|---|---|---|---|---|---|---|
| Aft Exit Cone | MPCE-1 | MX-4946 | 1.463 | 1.483 | 0.65 | 36.45 | | 4.22 | 0.193 | 0.341 |
| | MPCE-2 | MX-4926 VC | 1.097 | 1.144 | 0.39 | 31.83 | | 5.42 | 0.269 | 0.459 |
| | | MX-4920 VC | 1.424 | 1.468 | 0.67 | 28.01 | | 3.05 | 0.219 | 0.326 |
| | MPCE-3 | UF MX-4920 | 1.458 | 1.504 | 2.84 | 28.44 | 18718 | 6.73 | 0.254 | 0.677 |
| | | UF MX-4920 VC | 1.368 | 1.415 | 1.42 | 33.73 | 22534 | 6.37 | 0.292 | 0.991 |
| | MPCE-4 | UF MX-134 LDR | 1.212 | 1.243 | 1.85 | 40.97 | | 4.54 | 0.272 | 0.431 |
| | | UF MX-4920 VC/PC | 1.324 | 1.396 | 0.06 | 31.66 | 20583 | 4.57 | 0.344 | 0.504 |
| | MPCE-5 | FM-32800 LD/LF | 1.098 | 1.190 | 0.80 | 27.45 | 16646 | 4.11 | 0.285 | 0.429 |
| | | UF MX-134 LDR PC | 1.212 | 1.245 | 2.02 | 42.29 | 16759 | 4.15 | 0.258 | 0.400 |
| | MPCE-6 | MX-4926 VC/PC | 1.084 | 1.154 | 0.00 | 30.93 | 18195 | 4.93 | 0.299 | 0.525 |
| | | FM-32800 LD/LF PC | 1.127 | 1.213 | 0.46 | 28.10 | 7748 | 4.94 | 0.365 | 0.443 |
| | MPCE-7 | MX-4955 VC | 1.371 | 1.428 | 0.17 | 27.02 | 16872 | 3.42 | 0.398 | 0.484 |
| | | MX-4946 VC | 1.323 | 1.412 | 0.13 | 35.44 | | 3.24 | 0.450 | 0.534 |

Fig. 11

| Material Description | Bulk Density, gm/cc | Across Ply Tensile, psi | | Full Tensile Stength, psi | Permeability, Log [Darcy's] | | Shear (Torsion), IL, psi | Open Porosity, % | Max Peak Height in AP Th. Expan, 10⁻³ in./in. |
|---|---|---|---|---|---|---|---|---|---|
| | | Ambient | 750°F | | Across-ply | Fill | | | |
| NARC HRPF | 1.464 | 3720 ±332 (8.9) | 326 ±34 (10.5) | 20770 ±2408 (11.6) | −15.67 ±0.41 | −15.47 ±0.43 | 5760 ±888 (15.4) | ≈ 0.5 | |
| MX-4926 VC | 1.168 | 2222 ±75 (3.3) | 823 ±31 (3.8) | 13025 ±425 (3.3) | −12.27 | −10.24 | 3318 ±31 (0.92) | 14.67 | 23 @ 1100 |
| UF MX-4926 LDR (1.2) | 1.233 | 1258 ±60 (4.7) | 46 ±12 (25.3) | 38225 ±1125 (2.9) | <−20 | <−20 | 2215 ±7 (0.32) | 0.66 | 34 @ 500 |
| MX-4920 VC | 1.337 | 846 ±38 (4.4) | 156 ±40 (25.5) | 34100 ±2950 (8.6) | −12.00 | −9.77 | 2782 ±84 (3.03) | 8.89 | 33 @ 1000 |
| UF MX-4920 | 1.516 | 632 ±8 (1.2) | 151 ±8 (5.5) | 43750 ±704 (1.7) | <−20 | −12.28 | 3013 ±114 (3.78) | 0.56 | 38 @ 550 |
| FM-32800 LD/LF | | | | | | | | | |
| FM-32800 LD | | | | | | | | | |

LOW DENSITY COMPOSITE ROCKET NOZZLE COMPONENTS AND PROCESS FOR MAKING THE SAME FROM STANDARD DENSITY PHENOLIC MATRIX, FIBER REINFORCED MATERIALS

RELATED APPLICATIONS

This is a completion of U.S. Provisional Application No. 60/048,605 filed on Jun. 4, 1997, U.S. Provisional Application 60/048,604 filed on Jun. 4, 1997, and U.S. Provisional Application 60/048,672 filed on Jun. 5, 1997, the complete disclosures of which are incorporated herein by reference.

BACKGROUND OF THE INVENTION

1. Field of the Invention

The present invention relates to low-density composite articles and, in particular, to low-density rocket nozzle components. The present invention further relates to a process for making the low-density composite rocket nozzle components.

2. State of the Art

Solid rocket motor nozzle components have been fabricated using conventional composite starting materials referred to as pre-pregs. Pre-preg materials generally include fabric and/or fiber that has/have been pre-impregnated with resin, typically a phenolic resin. The fabric or fiber is referred to as the reinforcement of the composite while the resin is called the composite matrix or matrix formulation.

Depending upon the position and function of the component in the nozzle and the intended application of the nozzle, either a standard-density or low-density material (pre-preg) may be used.

Historically, pre-pregs for fabricating standard-density composite rocket nozzle components include the reinforcement, matrix formulation, and appropriate fillers. In the case of standard-density carbon or graphite cloth reinforcement and phenolic resin, carbon having substantially the same density as the carbon fiber is selected as the filler. Carbon or graphite fibers can be rayon, polyacrylonitrile ("PAN") or pitch-based materials. Glass and silica composite pre-pregs utilize silica fillers when fillers are used.

To achieve a low-density composite (LDC) pre-preg, which is advantageous in reducing motor weight of a rocket motor formed therefrom, hollow spheres, such as described in U.S. Pat. Nos. 4,268,320, 4,294,750, or U.S. Pat. No. 4,621,024, are introduced into the pre-preg formulation as the filler. The effective densities of these hollow spheres typically range from 0.2 g/ml to 0.5 g/ml. To prevent the hollow spheres from clumping in the pre-preg, an elastomer is added to the resin mix to maintain a more even dispersion of the hollow spheres during pre-impregnation of the fiber/fiber reinforcement. However, due to the expense associated with hollow spheres and the elastomer added to the resin mix, as well as other known difficulties in producing the low-density pre-preg, the cost of the conventional low-density composite material can be 50 to 100 percent higher than that of the standard-density version of the material.

The inclusion of hollow spheres and elastomer in the pre-preg formulation also results in a composite having an across-ply tensile strength as low as one-tenth that of standard-density material. The lower across-ply tensile strength of LDCs significantly increases the likelihood of the LDC rocket nozzle components experiencing ply lifting, wedge outs and other failure phenomena. LDCs used in exit cone environments can exhibit ply lift. The tendency of these materials to exhibit these failure modes must be addressed and accommodated by nozzle design. Such accommodation typically involves making the components thicker to improve margins of safety; however, the added thickness of the components partially offsets the weight advantage, i.e., the lower density, that LDC materials have over standard-density materials.

One predominantly used process for the fabrication of conventional so-called standard-density nozzle components involves applying material to a mandrel such as by tape wrapping; ply-by-ply applying and debulking of pre-preg at very high pressures and temperatures to soften the resin, immediately followed by cooling; and autoclaving or hydroclaving curing, such as by pressurized curing at 200 to 1000 psig. The material is applied to the mandrel in such a way as to achieve 80 to 95 percent of the material debulk (compaction) required in the final component. Currently practiced processes can require a pressure greater than 800 psig to 2400 psig, to achieve desired debulking. Final debulking is achieved during the pressurized cure. This process provides a cured composite specific gravity (SpG) in carbon/graphite phenolic components of 1.40 to 1.60, glass phenolic components of 1.95 to 2.05 and silica phenolic components of 1.70 to 1.80 (g/ml).

The conventional pre-pregs are designed to be used at elevated (high) pressures and temperatures to produce fully densified composites.

Each of the above-mentioned processes have different drawbacks, some of which are noted above. In particular, the art has sought low-density composite rocket nozzle components which are produced at lower average per unit cost, but which are capable of exhibiting the erosion resistance, charring resistance, and across-ply tensile strengths of a comparable rocket nozzle component made by the conventional process with a standard-density composite.

SUMMARY AND OBJECTS OF THE INVENTION

The present invention provides a process which overcomes the above-mentioned and other drawbacks associated with the conventional manufacture of composite rocket nozzle components and addresses the needs expressed above, while affording a reduction in manufacturing costs.

The present invention also provides articles, such as composite rocket nozzle components, that synergistically combine the excellent physical properties and low production costs of standard-density nozzle components with the reduced weights of LDC nozzle components, even when the components are substantially or completely devoid of low-density fillers (microballoons etc.).

The present process achieves the aforementioned advantages while enabling the practitioner to avoid the need to use a specially designed pre-preg to fabricate low-density composite articles, including rocket nozzle components.

These and other features and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings:

FIG. 2 is a diagrammatical view of a tape wrapping process suitable for practicing an embodiment of the present invention;

FIG. 3 is a schematic showing a press debulking step practiced in accordance with another embodiment of the present invention;

FIG. 5 is a side view of a platen press showing the vacuum bag and bleeder material;

FIGS. 6A and 6B comprise a table summarizing results obtained with composites;

FIGS. 10A and 10B comprise a table reporting a comparison of tag end properties with FPC billet performance;

FIG. 11 is a table of results from testing of composite materials;

Figure 1:
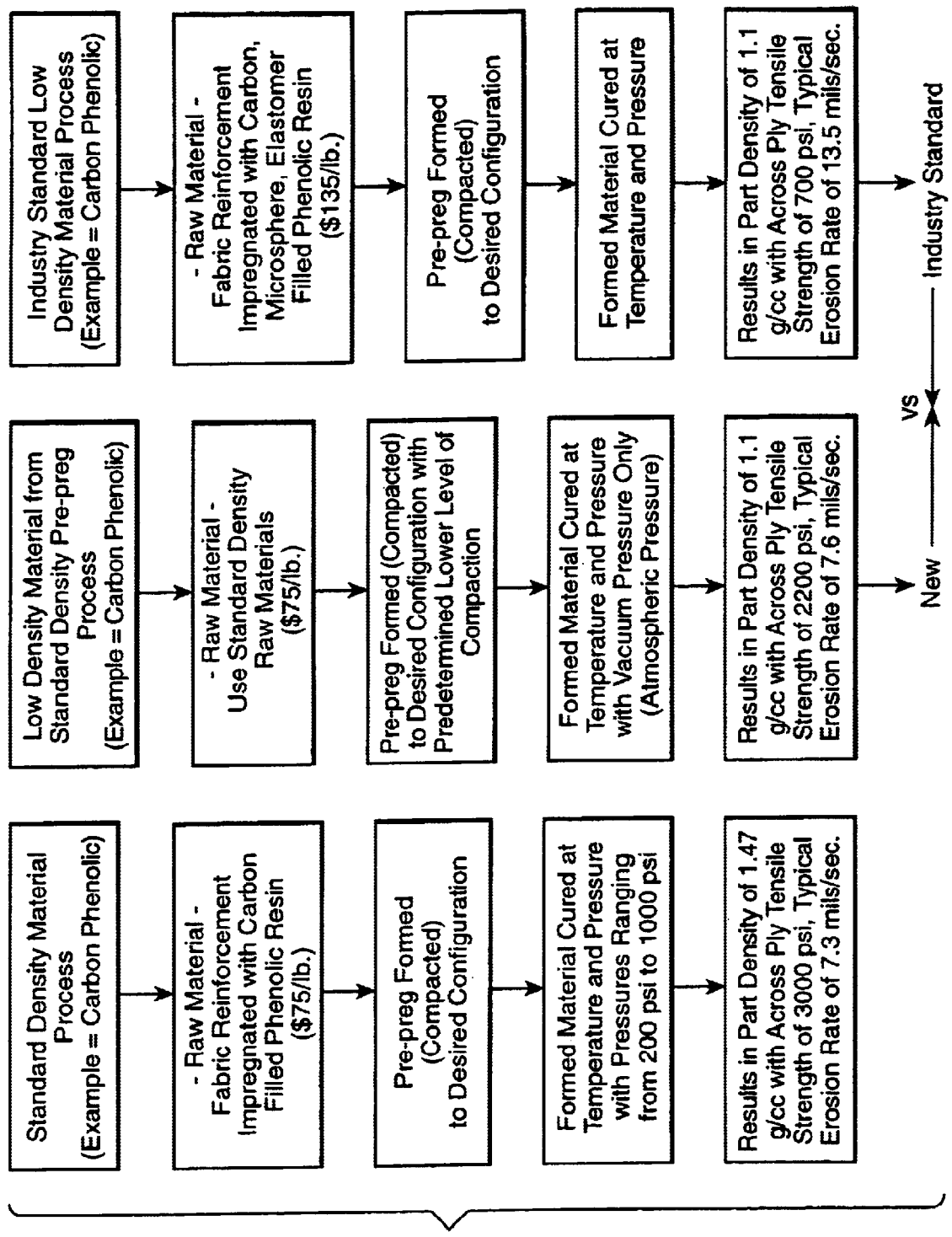
FIG. 1 is a flow chart comparing a process for preparing conventional "standard-density" composite articles, the present process for preparing low-density composite articles, and an industry standard process for preparing low-density composite articles.
Figure 4A:
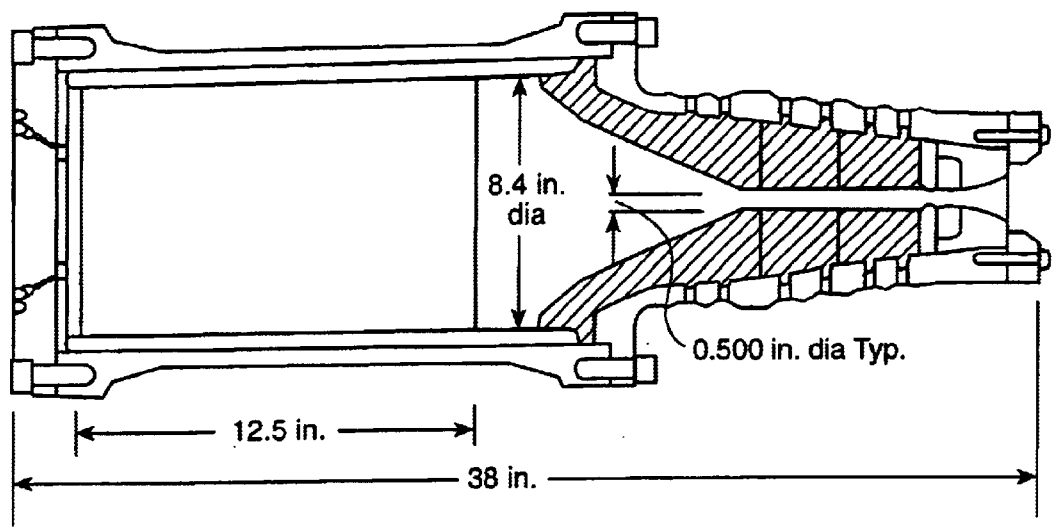
FIG. 4A is a cross-sectional view of a forty pound charge motor having propellant loaded therein.
Figure 4B:
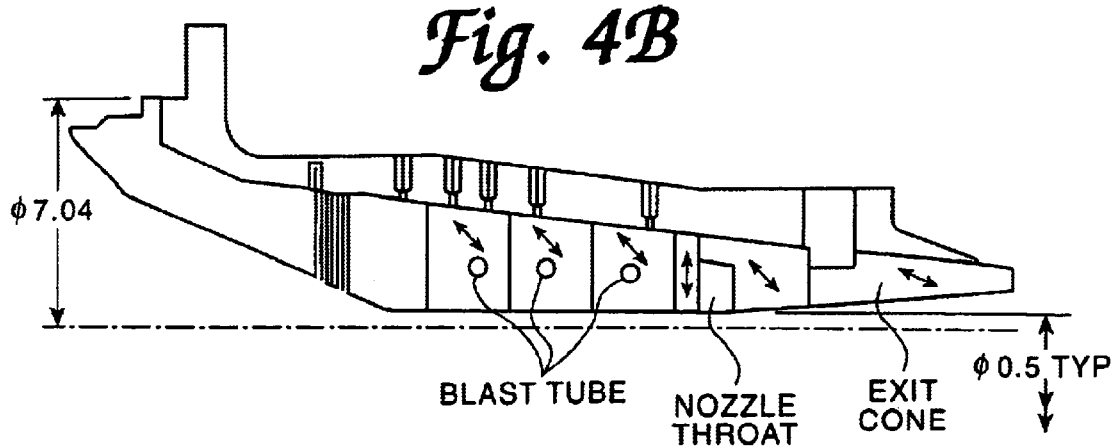
FIG. 4B is a sectional sliced side view of a forty pound charge rocket motor ("FPC") which is useful for testing nozzle materials.
Figure 4C:
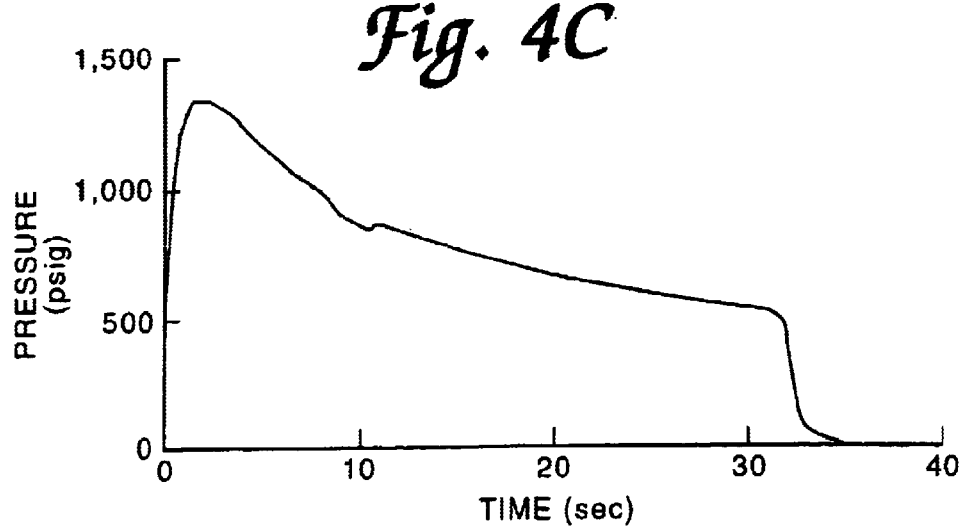
FIG. 4C is a graph showing the relationship of time and pressure.
Figure 7:
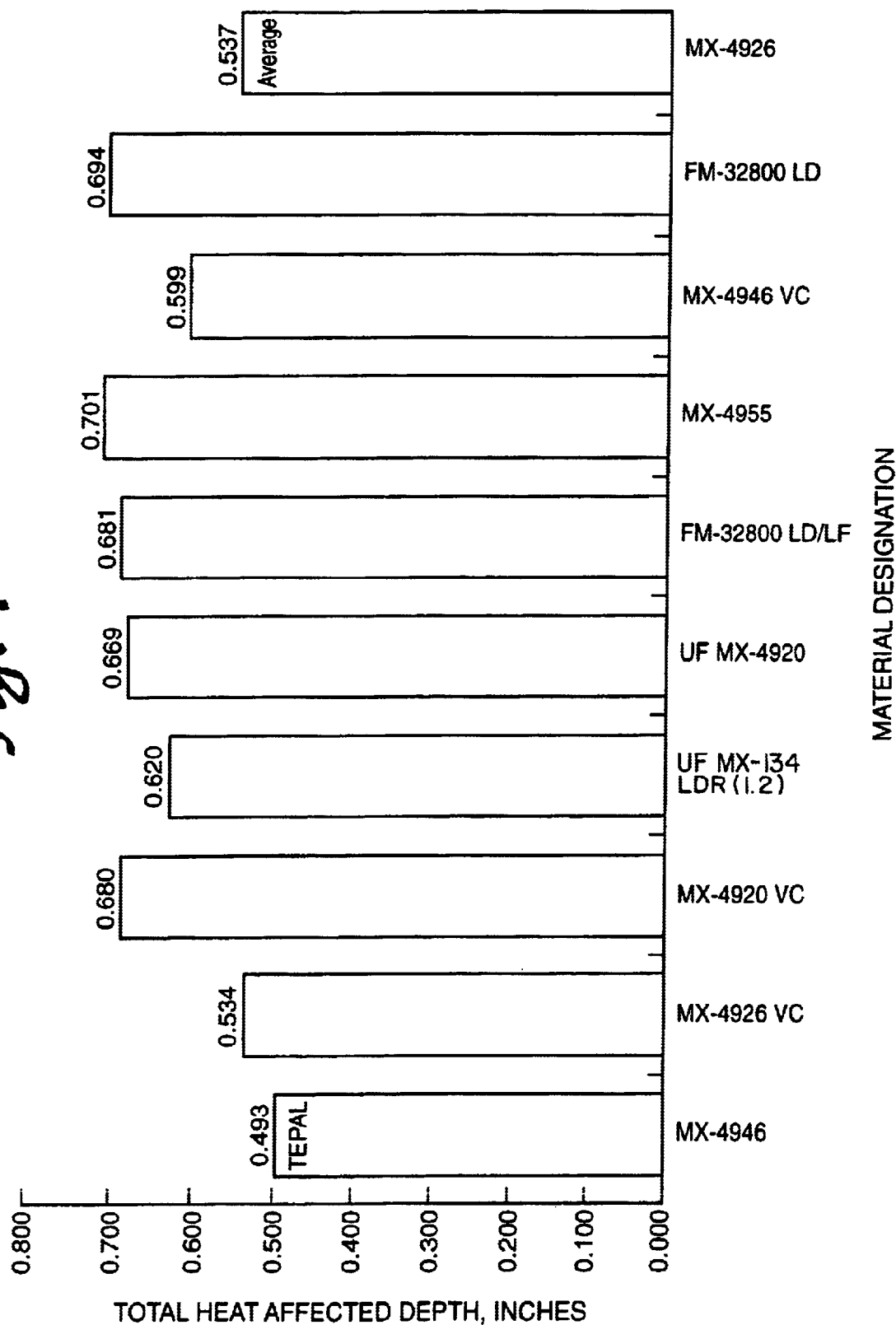
FIG. 7 is a bar graph reporting total heat affected depths of forty pound charge (FPC) motor 45° blast tube sections.
Figure 8:
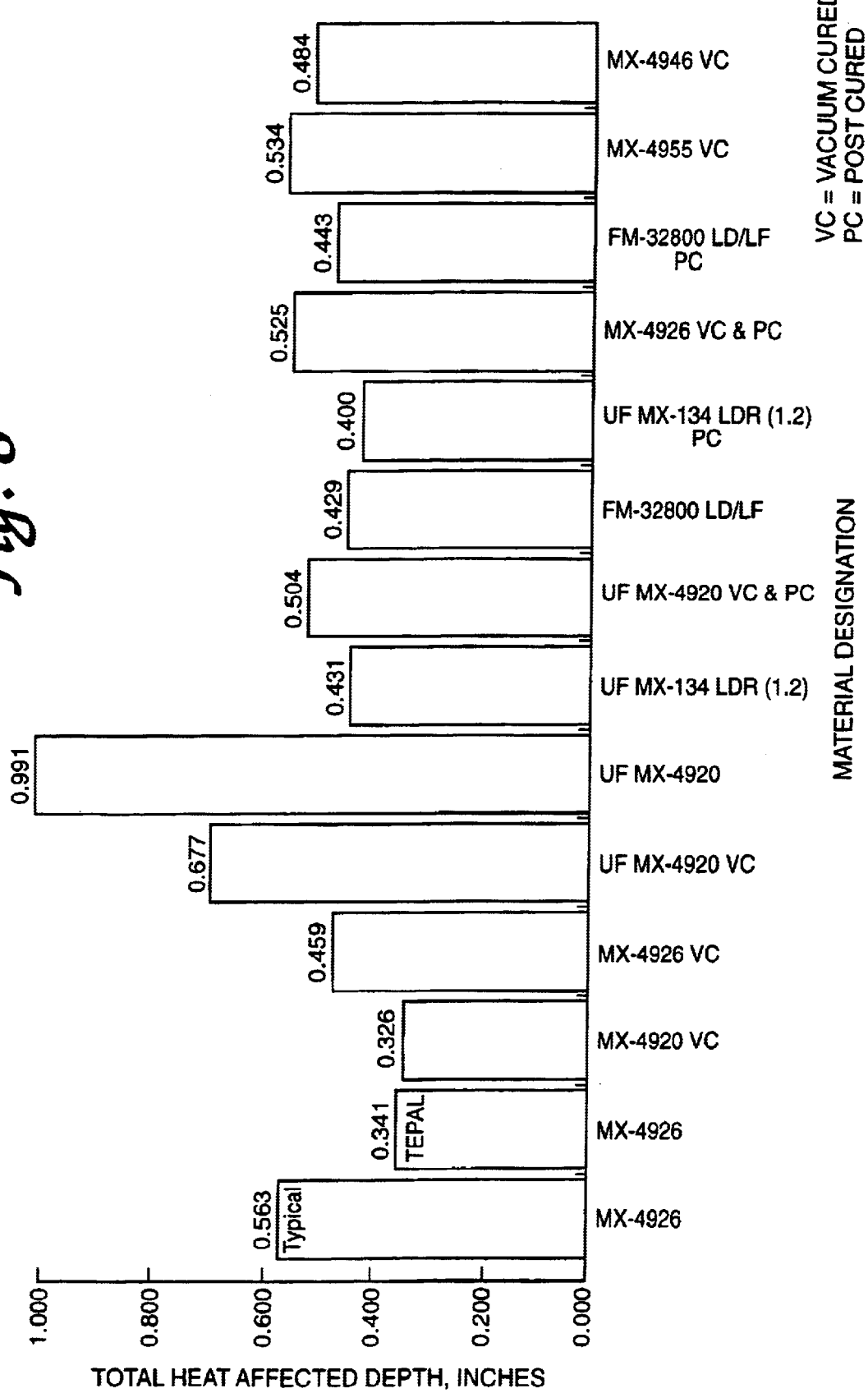
FIG. 8 is a bar graph reporting total heat affected depths of forty pound charge (FPC) motor 30° blast tube sections.
Figure 9:
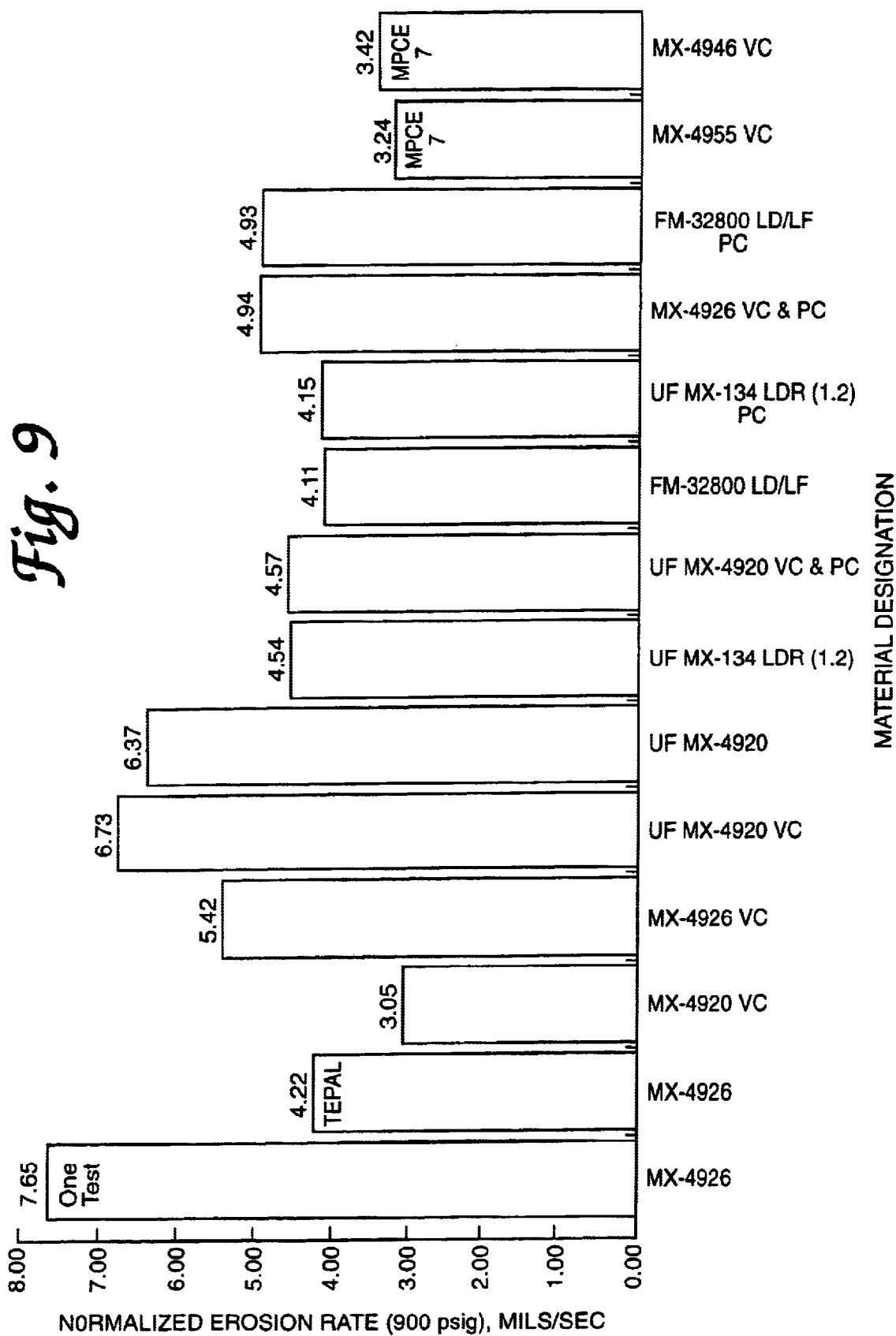
FIG. 9 is a bar graph reporting some normalized erosion rates of aft exit cone section test specimens.
Figure 12:
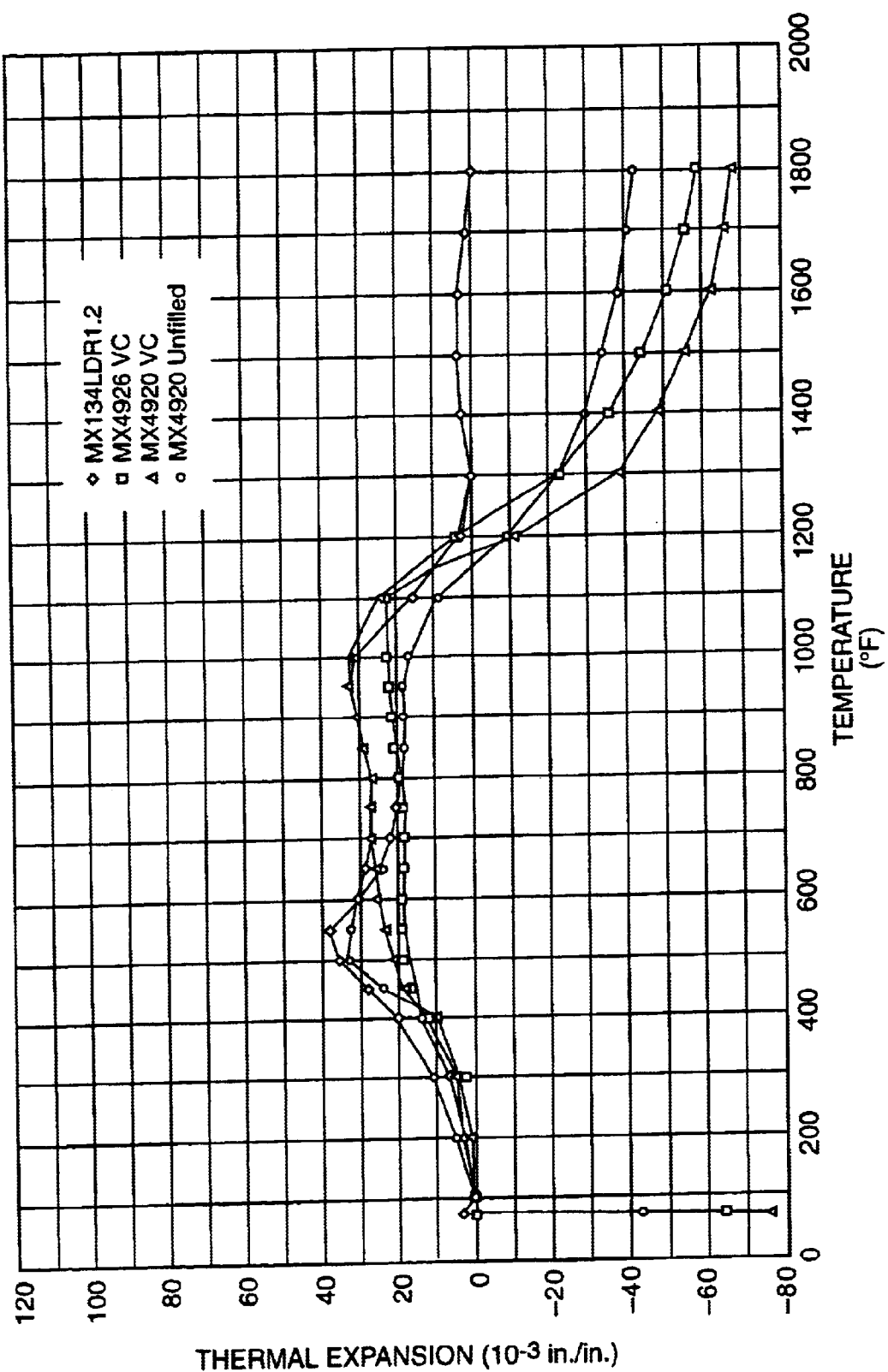
FIG. 12 is a graph showing a comparison of average across-ply thermal expansion as a function of temperature (10° F./sec)
Figure 13:
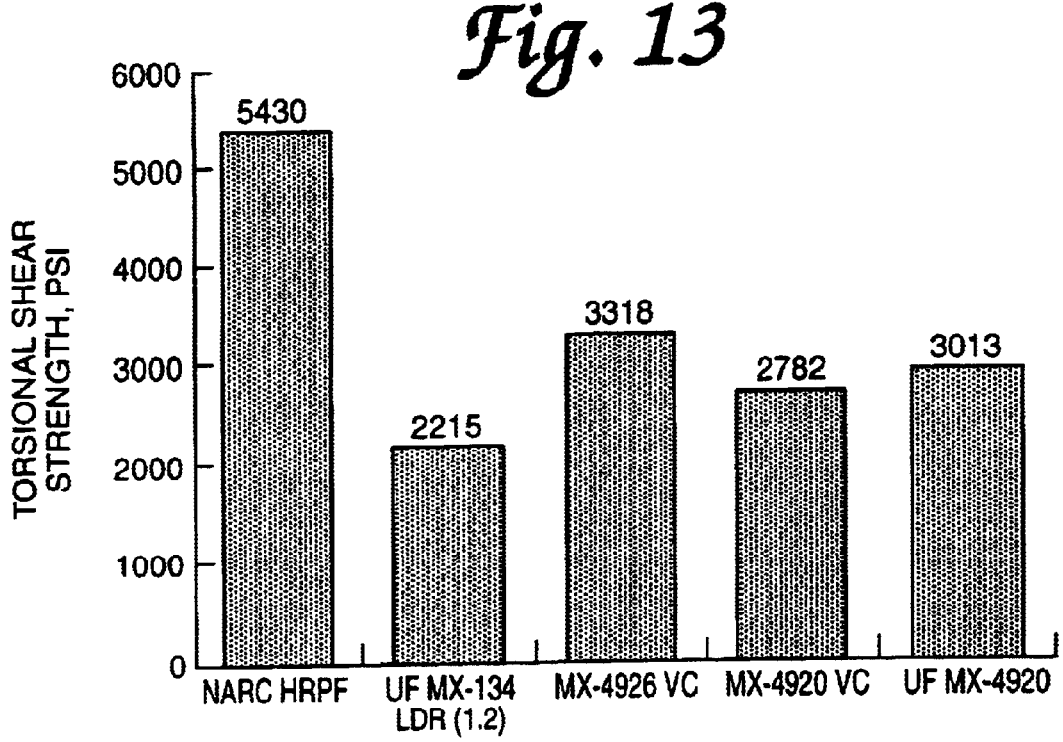
FIG. 13 is a bar graph of a comparison of ultimate torsional shear strength of modified materials.
Figure 14:
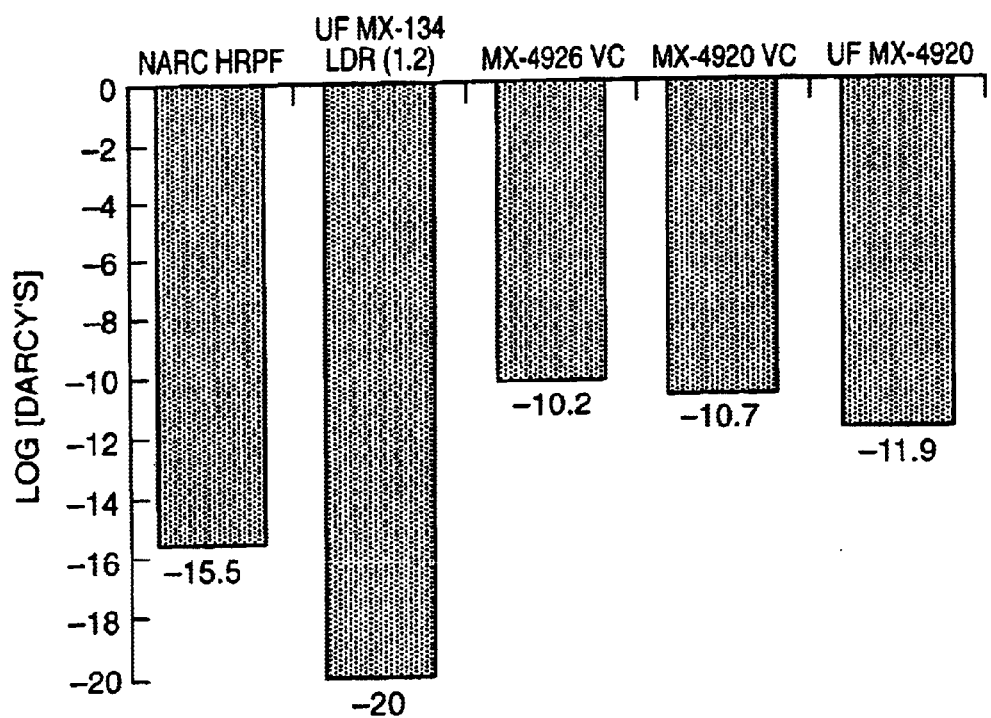
FIG. 14 is a bar graph of a comparison of fill permeability of modified composite materials.
Figure 15:
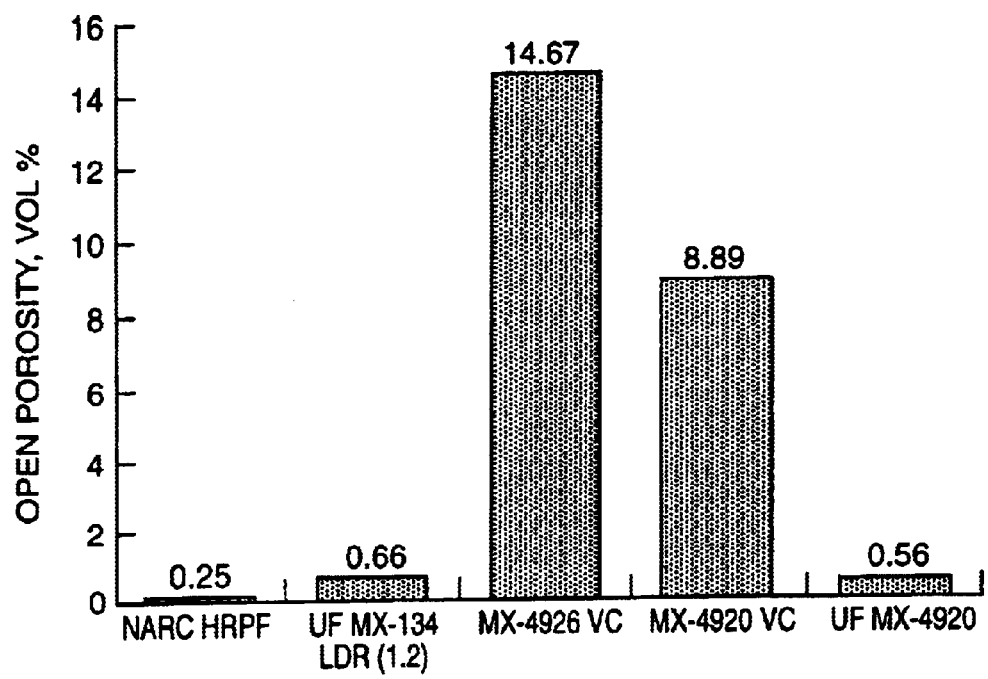
FIG. 15 is a bar graph of a comparison of open porosity of modified composite materials.
Figure 16:
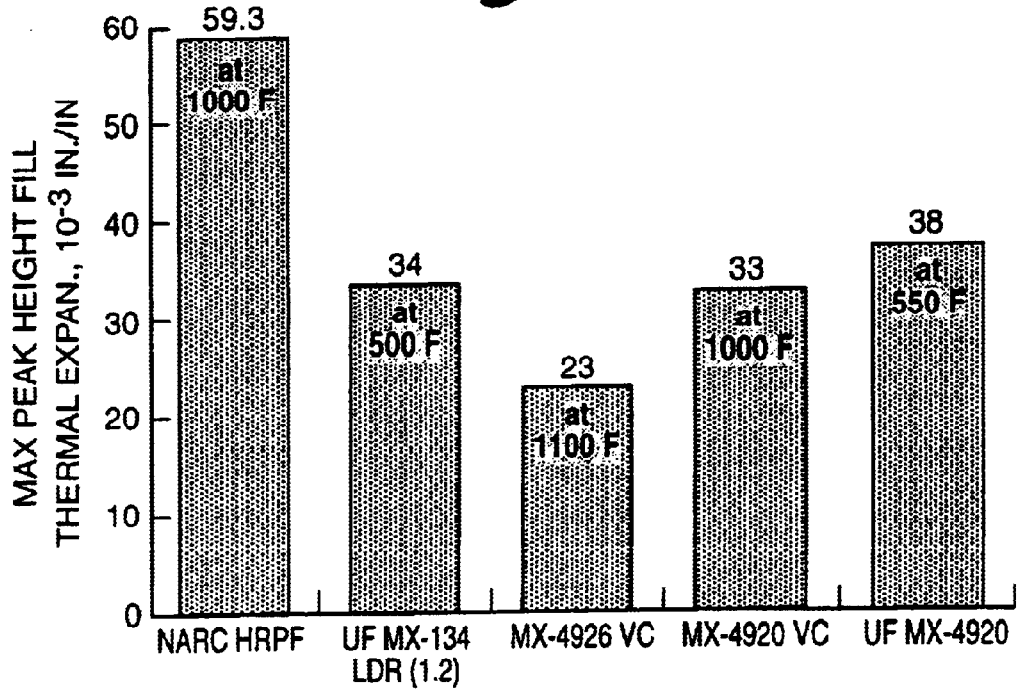
FIG. 16 is a bar graph of fill thermal expansion maximum height of modified materials.

In the Figures, various designations may be used. UF means unfilled. VC means vacuum cured according to the present invention. "NARC HRPF" means standard-density composite made using a pre-preg MX-4926 from Fiberite. An "LDR" designation, such as in FIG. 7, means specially formulated pre-preg designed for use in fabricating a conventional low-density composite having microballoon fillers. The designation "PC" means a post-cure step.

DETAILED DESCRIPTION OF THE INVENTION

The present process concerns the production of composite reinforced products, particularly rocket nozzle type components. The novel rocket nozzle components have lower density compared to corresponding industry standard-density composite reinforced rocket nozzle components. The rocket nozzle components, however, remarkably exhibit erosion resistance and charring which are similar to the high-density products prepared using an industry standard practice. Thus, in addition to cost savings, the process offers a reduction in the weight penalty and the retention of desirable erosion and charring properties in finished rocket nozzle components.

In general, the process comprises (a) forming a compacted pre-preg into a desired configuration under a predetermined level of compaction which is less than the compaction (pressure) applied in the conventional process; (b) curing the formed pre-preg at a selected temperature and pressure, wherein the pressure can be vacuum or less than about atmospheric pressure (e.g., about 14 lbs/sq. inch at sea level); and (c) obtaining the cured product, such as a low-density rocket nozzle component. In the process the pre-pregs are partially debulked and, in general, may be debulked less than 80% or, more particularly, debulked to less than about 50%. Therefore, although the terms "debulked" or "debulking" may be used in describing the invention, it should be understood that what is meant is "partially debulked," e.g. less than 80%, and preferably less than 50%, debulked.

In accordance with the process, the forming and curing are conducted at sufficiently low pressures to permit the formation of voids in the resulting component, the voids being formed from volatiles evolving during the curing. Hence, the resulting cured product has a lower density than standard-density products, even when the cured product of the present invention is formed from a composition substantially or completely free of low-density fillers, such as hollow spheres ("microballoons"), and elastomers.

Generally, the cured articles prepared in accordance with the present invention have a specific gravity which is lower than standard-density composite rocket nozzles. For instance, with a suitable carbon phenolic resin-based pre-preg, a lower density (SpG) in a range of about 1.00 (e.g. 1.03) to about 1.15 g/ml can be prepared, and for other pre-pregs, such as a silica cloth pre-preg, composite rocket nozzle components having densities (SpG) of about 1.35 to 1.49 can be fabricated. Further, the cured articles of the present invention also exhibit across-ply tensile strengths which may be greater than, or at least near to, those observed with well-prepared composites from standard-density pre-pregs. For instance, the composite rocket nozzles of the invention can have an across-ply tensile strength of about 1800 to about 3000 psig and, more particularly, can be readily prepared to have across-ply tensile strengths of 1800 to 2200 psig.

In accordance with one embodiment of the present invention, the above-mentioned (a) can be performed by winding a suitable pre-preg material about a mandrel using a tape wrap process as shown in FIG. 2. In the illustrated tape wrap embodiment, a pre-preg material or tape to be wrapped is in rolled form about a reel or spool 10. The tape is unwound from spool 10 and passed between a roller 11 and a mandrel 12. In the illustrated embodiment, the mandrel 12 rotates clockwise and the roller 11 rotates counter-clockwise as the tape to be wrapped about the mandrel 11 is fed therebetween. Each of the roller 11 and the mandrel 12 has a longitudinal axis; the longitudinal axes of the roller 11 and mandrel 12 are situated in parallel relationship with respect to each other. The pre-preg tape is heated, such as by a hot air source, as it crosses over the roller 11 in order to soften the tape. The hot air can be supplied to the tape at a temperature in the range of about 350 to about 900° F., but, in present practice, a temperature in the range of about 350 to 550° F. has proven sufficient. The pressure is applied to the tape at the interface of the roller 11 and the mandrel 12 debulks the tape as it wraps onto mandrel 12. The pressure applied by the roller 11 and the mandrel 12 is generally less than about half (50%) of the lowest pressure recommended by pre-preg vendors (100 to 300 pounds per inch of tape width) and about 50 pounds per inch of tape width is exemplary of such a lower pressure. The tape is cooled and preferably hardened as the tape is wrapped about the mandrel 12. As shown in FIG. 2, carbon dioxide (or other coolant) from a liquid holding tank is applied to the wrapped tape as the tape wraps about the mandrel 12. This cools and hardens the wrapped tape about the mandrel whereby a wrapped billet is formed.

As mentioned above, (b) involves curing the formed pre-preg at a selected temperature and pressure. The pressure can be vacuum or up to less than about atmospheric pressure. In accordance with one embodiment of the present invention, the wrapped billet can be vacuum bagged using a vapor impermeable vacuum bag, such as a nylon vacuum bag, sealed with vacuum putty. In the vacuum bagging procedure, a suitably thick or suitably layered bleeder material is used so that any resin bleed from the curing material does not clog vacuum lines and also avoids (if not minimizes) adversely affecting the vacuum bag itself. In this regard, a bleeder material may comprise, for instance, at least one layer of perforated film; at least two layers of cotton mop; or at least two layers of bleeder material, such as a polyester bleeder material (about 10 oz or about 16 oz./sq. yard of polyester bleeder material). The vacuum bagged material is then cured using a selected maximum vacuum. By preference, the vacuum provides the only pressure applied during the curing, and low pressures on the order of subatmospheric up to about, preferably less than, atmospheric can be used, such as a vacuum equivalent of about 12.5 psia to less than about 14.7 psia, although the pressure selected will depend on the prevalent atmospheric pressure. Still lower pressures can also be used. In general, however, the low pressure vacuum can, for instance, be in a range of from about 12.5 psia to about 14 psia and, more particularly, in a range of from about 12.5 psia to about 12.7 psia.

The cure pressure is adjusted to maintain or provide the desired cured component density. The cure pressures can range, for instance, from 12.5 psia to about 150 psig, but generally a lower upper pressure is preferred, such as up to about 50 psig. A suitably applied low cure pressure can be achieved by vacuum bagging the component by adapting the methodology per standard procedure for cure, but in which a vacuum is pulled throughout the cure cycle.

During the curing step, it is possible to use thermal cycling to cure the pre-preg. In the temperature cycling, various temperatures, or temperature and residence times, are selected to ensure the satisfactory curing of the composite article fabricated in accordance with the process of the present invention. An exemplary, non-limiting temperature cycle that can be practiced in accordance with an embodiment of the present invention involves a thermal cycle in which the pre-preg is heated and cooled in cycles which change on the order of about 1° F. per minute. In another embodiment, a three-stage temperature cycle can be used, although other staged temperature cycling can be used within the scope of the invention. For instance, the thermal cycling can be programmed to have a first hold at about 180° F. for a residence time of about 1.25–1.5 hours, a second hold at about 220° F. for a comparable residence time as the first hold, and a third hold at a temperature in a range of from about 310° F. to about 320° F. for about 60 or more minutes for each inch of component wall thickness. The residence time at a holding temperature will be a function of process variables, such as the thickness of the material to be cured.

The determination of suitable curing cyclings, including both residence times and cure temperatures, is within the purview of those skilled in the art and can be determined without undue experimentation when done in reference to the instant disclosure.

A further post-cure step can, if desired, be conducted.

Referring now more particularly to FIG. 3, press debulking in a mold can be employed as an alternative to tape wrapping for performing step (a). In the illustrated embodiment, a ply or stack of plies 31 is placed in a platen press for debulking. Ordinarily, the platen mold comprises a first platen 30 and a second platen 32 preheated to a temperature of about 130° F. to about 150° F. before the ply or stack of plies 31 are placed in the mold. During the partial debulking, a pressure F is applied to urge platen 30 to close to compact a ply or stack of plies of curable pre-preg 31 on second platen 32. Stops 33 are set to restrict the travel of platen 30 and to achieve the selected debulked thickness. The platens 30 and 32 remain closed to the stops and the temperature is held at about 130 to 150° F. for a sufficient amount of time to allow the ply layers to stabilize, equilibrate, at the pressure and come to a relatively even temperature. The partial set achieved with the partially debulked plies is not a cured set, e.g. by preference the debulked plies are not thermoset. For instance, in general, the residence time of the ply or plies 31 in the closed platen mold is about 20 to 30 minutes when most rocket nozzle components are being fabricated and, particularly, when about 30 to 40 pre-preg plies are being used. It has been discovered that some rocket nozzle components need only a relatively short time, such as about 20 minutes residence time, in the closed platen. The partially debulked plies (or debulked stacks of plies) are allowed to cool to room temperature and then the platen mold is opened by separating platen 30 from platen 32. The debulked ply (plies) are obtained and then stacked to form the desired billet. The pressure is selected to be sufficient to press or de-bulk the plies to the stops.

Flat panels can be prepared using the platen mold process step to debulk the pre-preg. For instance, for a 0 degree ply angle flat panel, ply stacks can be debulked to stops (see FIG. 3) to achieve the preselected ply thickness. Ply thicknesses can vary, but plies of 20 to 22 mils can be facilely prepared. In general, debulked ply stacks are less than about 1 inch thick (less than 2.54 centimeters), such as, for example, 0.80 inch thick perpendicular to the ply. For billets other than flat panel lay up, it may be desired to use different ply angles. For instance, a 45 degree ply angle can be used in a closed cylindrical mold with angled end plugs inside of the press. The debulked plies, as stated above, have a thickness of less than about 1.0 inch perpendicular to the ply. Debulking can be achieved by warming the plies and the mold to a suitable temperature, generally above 100° F., such as about 130° F. to about 150° F., while applying pressure to close the press to stops. The debulked plies are allowed to cool while the press remains closed to the stops. After debulking, the ply stacks are stacked together. Flat panels can be free standing and angle lay ups can be contained within the mold. The ply stacks are vacuum bagged and cured to a temperature cycle as described above.

The platen mold with configured (shaped) pre-composite (uncured debulked, shaped uncured article) can, if desired, be autoclaved or placed in an oven for curing.

Material is applied to the mandrel or debulked in a mold using a pressure that yields a ply spacing which results in a composite of the desired density. Thus, to provide desired composite density, debulk application pressures can be varied from just a few psig to less than about 800 psig. The pressures may generally be in a range of 240 psig to about 40 psig. Importantly, in contrast to conventional debulking techniques, the present process uses lower pressures.

The present process is atypical and contrary to a vendor recommended procedure for using a standard-density pre-preg. In the present process, tape wrap or compaction pressures are selected in combination with cure pressures that allow voids to form based on the vapor pressure of the constituents of the resin. For instance, in the tape wrap embodiment, the pressure for applying the pre-preg to the mandrel is backed off sufficiently until the selected ply spacing is achieved. The debulked billet can be vacuum bagged and cured, whereby the applied vacuum results in atmospheric pressure being applied to the billet, providing across-ply pressure that results in a cured component having an across-ply tensile strength that is greater than the across-ply tensile strengths achieved in pre-pregs which were specially designed by vendors to result in low-density composite components. The use of the vacuum bag technique offers the further related advantage that volatiles evolving in the cure are capable of growing into voids in the curing material which further reduces the density of the component. As a consequence, a conventional standard-density material can now be used to produce a low-density composite component.

Panels fabricated according to the present process using a standard-density grade carbon phenolic indicate that a cured bulk density as low as 1.0 to 1.15 grams per cubic centimeter can be produced. In contrast, the same material, processed to typical vendor-recommended process parameters which are the norm in the industry, results in a composite component having a bulk density of 1.45 to 1.49 grams per cubic centimeter.

For instance, the present process can produce cured products from filled pre-pregs which have a lower density than a corresponding product prepared according to industry standard. A silica-filled phenolic pre-preg was processed to a cured article having a density of 1.53 g/ml using the present process whereas like material processed using the industry standard process had a density of 1.75 g/ml. A glass-filled pre-preg was likewise processed to a cured product having a lower density (1.81 g/ml) verses 2.0 g/ml for a conventionally prepared article.

Suitable pre-preg materials are generally characterized by a reinforcement (fibers, cloth, tape) which is impregnated with a thermosetting resin. Suitable reinforcement can comprise a wide variety of fibers or filaments known in the art. These fibers and filaments include, but are not limited to, glass fibers, boron filaments, boron nitride, silicon carbide, graphite (carbon) filaments and high modulus organic filaments, particularly organic filaments of the nylon, polyethylene, and aramid type. Examples of high modulus organic filaments include, but are not limited to, poly (benzothiazoles) and poly(aromatic amides) which are commonly referred to simply as "aramids." Aramids include poly(benzamides) and a family of materials sold by E. I. DuPont under the trademark KEVLAR. As an example of carbon filaments useful in this invention, there may be mentioned, for example, Amoco's Performance Product T-300 and Toray's T-800H and T-1000G carbon fibers. Suitable thermosetting resins include, for example, phenolic resins, and epoxy resins (especially those based on diglycidyl ethers of bisphenol A are employed). In principle, bis-maleimide resins, polyurethanes, polyesters, and the like, and any combination thereof may also be employed as the base resin or a component thereof.

By preference, for the composite materials requiring erosion resistance, good ablative performance, and good across-ply tensile strength required for rocket nozzle components, a phenolic resin matrix resin for the pre-preg is used. Suitable commercially available curable phenolic resins are SC-I008 (Borden) and 91-LD phenolic resin (Stuart-Ironsides).

Epoxy-based pre-pregs are not preferred for rocket motor nozzle components.

A suitable pre-preg is, in general, pliable to enable it to be wrapped. Pliability is generally observed prior to debulking and curing.

The pre-preg materials can, if desired, include filler materials. Suitable filler materials include silica, carbon powder and others known to those skilled in the art. Filler materials can serve more than one function. For instance, some fillers, including powdered alumina trihydrate or antimony oxide, may also provide some flame resistance, or other characteristics to the final cured products, but are nonetheless fillers. The present process does not require, and preferably avoids the use of hollow microspheres (and elastomers) in order to produce a low-density composite article.

Various pre-preg materials are suitable for use herein. A carbon cloth impregnated with a curable phenolic resin can be used. The carbon cloth can be rayon-based, polyacrylonitrile- (PAN-) based, or pitch-based. These types of pre-pregs include the industry standard-density pre-pregs such as MX-4926 (28–38% resin, 8–16% filler, the remainder including cloth reinforcement) which is a rayon-based carbon phenolic pre-preg from Fiberite. Other suitable materials from Fiberite include PAN-based pre-pregs, such as those sold under the designations MX-4946 or MX-4920 which both used a T300 fiber/yarn which is a vendor designation for a yarn having a modulus of 300 million. Other "T" type fiber/yarn products can be used. These materials can include a filler, and generally include carbon powder filler. Graphite cloth phenolics can be used. The graphite fiber can be rayon-, PAN- or pitch-based. Suitable commercially available graphite pre-pregs include Fiberite products sold under the designations MXG-175 (graphite which is rayon based) and MX-4961 (graphite which is PAN-based). Glass cloth pre-pregs include a glass fiber reinforced phenolic resin such as MXB-6001 from Fiberite. Silica fiber reinforced phenolic resin, such as a product from Fiberite known as MX-2600, can be used.

The following Table 1 lists some of the pre-preg materials and provides further characterization of the same. The fabric weave can be different between suitable pre-pregs. In Table 1, "HS" stands for harness satin weave, e.g. 8HS means 8 harness satin weave, etc., whereas a simple weave pattern comprises one over, one under, one over. With PAN materials, designations "3K," "6K" and "12K" refer, respectively, to 3000, 6000 and 12,000 filaments in a single yarn used in the pre-preg.

TABLE 1

Material Characteristics

| Material Designation | Reinforcement | Resin System | Filler | Billet Density, gm/cc | Processing Methods | Status/Use |
|---|---|---|---|---|---|---|
| MX-4926 (Fiberite) | Rayon-based Carbon Fiber, 8 HS | SC-1008 Phenolic Resole (Borden) | C | 1.45 gm/cc | Tape wrapping, compression molding | Used in nozzles on RSRM boosters, D-5, PK, MM, C-4, Castor 120 GT, Castor 4a, Star, etc . . . |
| FM-5055 (BP) | Rayon-based Carbon Fiber, 8 HS | 91-LD Phenolic Resole (Ironsides) | C | 1.45 gm/cc | Tape wrapping, compression molding | Same as MX-4926 |
| MX-4946 (Fiberite) | PAN-based Carbon fiber (T-300), 6 K, 5 HS | SC-1008 Phenolic (Borden) | C | 1.55 gm/cc | Tape wrapping, compression molding | Currently used in Castor 120 GT |
| MX-4920 (Fiberite) | T-300 Commercial, 12 K, 4 HS | SC-1008 | C | 1.55 gm/cc | Tape wrapping, compression molding | Low-cost material |
| Unfilled MX-4920 | T-300 Commercial, 12 K, 4 HS | SC-1008 | — | = 1.4 gm/cc | Tape wrapping, compression molding | Low-cost material Fiberite |
| MX-134 LDR (Fiberite) | T-300 Plain weave, 6 K | NBR modified SC-1008 | C, MB | = 1.1 gm/cc | Tape wrapping, compression molding | Lower cost low-density material Fiberite |

*Notes:
LD = low density, LDR = rubber modified low density, C = carbon black, MB = microballoons, HS = harness satin weave, NBR = norbutyldiene rubber, T-300 = AMOCO T-300 PAN-based carbon fibers In the foregoing table, the materials with MB, microballoons, may be used, but are not preferred because the composites produced therewith do not exhibit the overall balance of favorable properties for composites produced using standard-density pre-pregs according to the present invention. Thus, the present invention does not require the use of the conventional specially formulated pre-pregs for low density. As may be mentioned elsewhere herein, these low-density pre-pregs include a low-density carbon cloth phenolic, such as one in which the resin is filled with microballoons/microspheres, carbon filler and, optionally, an elastomer additive, such as MX-4926 LDC (rayon-based carbon fiber) from Fiberite. A low-density glass fiber-reinforced phenolic resin loaded (filled) with microballoons/microspheres is known as MXS-385LD from Fiberite. A low-density silica cloth phenolic filled with microballoons/microspheres is known, and may also have an elastomer-modified resin, such as the specially formulated low-density pre-preg known as MX-2600LD from Fiberite.

Final cured and shaped products producible by the present process include rocket nozzle components. The present process can also be used to manufacture composite panels. For instance, a standard-density carbon-fiber cloth impregnated with a curable phenolic resin can be used to prepare a panel having, when cured, a bulk density of 1.0 g/ml to 1.15 g/ml. This type of panel is more cost-effective than a panel or, for instance, other part, such as an aft exit cone, for a C4 missile.

Figure 17:
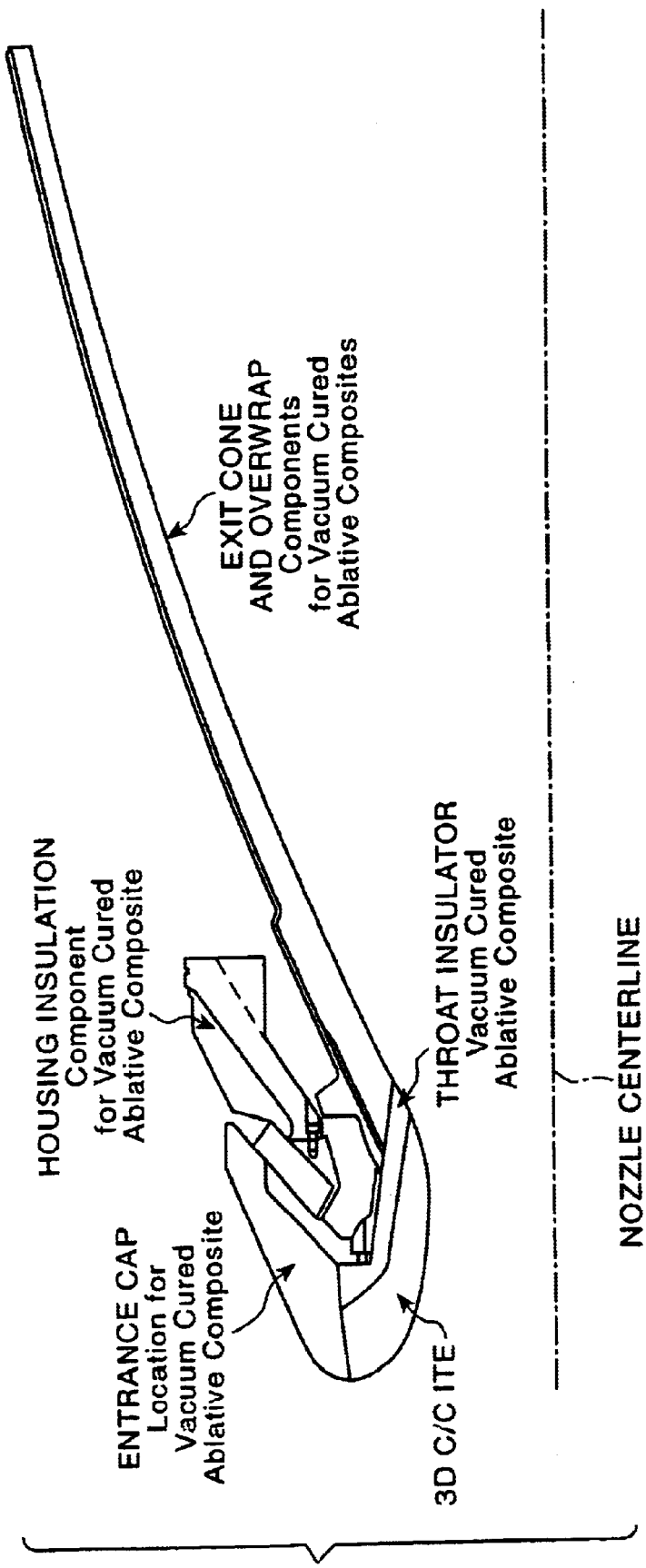
FIG. 17 is a cross-sectional view of a part of a rocket motor nozzle component.

The present process can be used to produce a specific tailored density composite article of manufacture, such as rocket nozzle components. Rocket motor components include, among others, blast tubes (aft, mid and/or forward); nozzle throats, exit cones and such components as depicted in FIG. 17. For instance, across-ply properties of the composite material can be tailored by adjusting the pressure used in the initial compaction step and pressure used in the cure step. Such adjustments are techniques that, when viewed in reference to this disclosure, would be within the purview of the skilled artisan without undue experimentation.

Composite components were fabricated according to the tape wrap and platen press embodiments of the present invention. Products made using the platen press embodiment were evaluated and low-density products with bulk densities in the range of 1.05 to 1.13 g/ml were fabricated. The products were tested in an FPC motor using a propellant for the Space Shuttle Solid Rocket Motor. Firing time in the tests ran from about 30 to 35 seconds, with average pressures in the range of about 650 psig to about 750 psig. These products were compared to a conventionally produced standard-density product. The results of this comparison are reported in Table 2.

TABLE 2

| Property | Invention | MX-4926 | MX-4926LD |
|---|---|---|---|
| Bulk Density (g/ml) | 1.05–1.13 | 1.45–1.48 | 1.0–1.15 |
| Across-Ply Tensile Strength (psi) | 2200 | 3000 | 700 |
| Erosion rate (mils/sec) | 7.6 | 7.3 | 13.5 |

The data show that orders of magnitude improvement in tensile strength and significant improvement in erosion resistance are attainable with composite rocket nozzle components prepared according to the present process. One of the unexpected beneficial attributes is the over 400% improvement in across-ply tensile strength with the present low-density composite products compared to the conventional low-density composite products.

Testing the low-density rocket nozzle components using the forty pound charge rocket nozzle demonstrated that the vacuum cured material had the desired combination of erosion resistance, charring, and across-ply tensile strength associated with a standard-density composite component prepared using the conventional procedure. However, the composites offered the additional advantage of lower weight compared to conventional composites that may have comparable erosion resistance.

TABLE 3

Performance Comparisons, FPC Nozzle Components

| Material Description | Cured Bulk Density (g/cc) | Compressive Strength (psi) | Erosion Rate (mils/ second) | Char Depth, (inch) | Heat Affected Depth (inch) |
|---|---|---|---|---|---|
| Vacuum-cured MX4926, 45° Blast Tube (rayon-based) | 1.14 | 19750 | 7.59 | .258 | .534 |
| Traditional MX4926, 45° Blast Tube (rayon-based) | 1.45 | 41850 | 7.59 | .246 | .502 |
| Vacuum-cured MX4920, 45° Blast tube (PAN-based) | 1.38 | 23067 | 6.18 | .464 | .680 |
| Traditional MX4926, 45° Blast tube (PAN-based) | 1.53 | — | 4.60 | .461 | .656 |
| Low-Pressure MX4926, 30° Exit Cone (rayon-based) | 1.10 | — | 5.42 | .269 | .459 |
| Traditional MX4926, 30° Exit Cone (rayon-based) | 1.46 | — | 4.22 | .193 | .341 |
| Low-Pressure MX4920, 30° Exit Cone (rayon-based) | 1.42 | — | 3.05 | .219 | .326 |
| Traditional MX134LDR, 30° Exit Cone (PAN-based) | 1.34 | — | 4.5 | .372 | .530 |

It will thus be seen that the objectives and principles of this invention have been fully and effectively accomplished. It will be realized, however, that the foregoing preferred specific embodiments have been shown and described for the purpose of this invention and are subject to change without departure from such principles.

What we claim is:

1. A process for producing a composite article having a selected configuration, said process comprising:
   (a) arranging a curable pre-preg into the selected configuration at a level of compaction sufficiently low to permit voids to be generated therein during subsequent curing of the pre-preg; and
   (b) conducting said subsequent curing of the pre-preg at a pressure sufficiently low to permit evolving gases to form voids in the pre-preg as the pre-preg cures into the composite article,
   wherein the pressure at which the pre-preg is cured in (b) is maintained at not more than about 50 psig.

2. The process of claim 1, wherein the pre-preg is essentially free of microballoons.

3. The process of claim 1, wherein the pre-preg comprises a phenolic resin.

4. The process of claim 3, wherein the composite article has a specific density in a range of from about 1.00 to about 1.15 g/ml.

5. The process of claim 1, wherein the pre-preg comprises a silica cloth material.

6. The process of claim 5, wherein the composite article has a specific gravity in a range of from about 1.35 to about 1.49.

7. The process of claim 1, wherein (a) comprises sequentially providing the pre-preg as a tape, heating the pre-preg to a softening temperature with hot air that is 350° F. to 900° F. in temperature, wrapping the pre-preg on a mandrel at a maximum pressure of up to about 50 lbs. per inch of tape width, and cooling the pre-preg.

8. The process of claim 1, wherein the pressure is maintained at more than 12.5 psia.

9. The process of claim 1, wherein the composite article comprises a rocket nozzle component.

10. The process of claim 1, wherein (b) is conducted in a vacuum bag.

11. The process of claim 1, wherein said arranging (a) comprises applying the curable pre-preg to a mandrel or mold at a debulk application pressure of less than 800 psig.

12. The process of claim 1, wherein said arranging (a) comprises applying the curable pre-preg to a mandrel or mold at a debulk application pressure in a range of from 40 psig to 240 psig.

13. A process for producing a composite article having a selected configuration, said process comprising:
   (a) arranging a curable pre-preg into the selected configuration under a level of compaction sufficiently low to permit voids to be generated therein during subsequent curing of the pre-preg; and
   (b) conducting said subsequent curing of the pre-preg at a pressure sufficiently low to permit evolving gases to form voids in the pre-preg as the pre-preg cures into the composite article,
   wherein the pressure at which the pre-preg is cured in (b) is maintained to be not more than atmospheric pressure.

14. The process of claim 13, wherein the pre-preg is essentially free of microballoons.

15. The process of claim 13, wherein the pre-preg comprises a phenolic resin.

16. The process of claim 15, wherein the composite article has a specific density in a range of from about 1.00 to about 1.15 g/ml.

17. The process of claim 13, wherein the pre-preg comprises a silica cloth material.

18. The process of claim 17, wherein the composite article has a specific gravity in a range of from about 1.35 to about 1.49.

19. The process of claim 13, wherein (a) comprises sequentially providing the pre-preg as a tape, heating the pre-preg to a softening temperature with hot air that is 350° F. to 900° F. in temperature, wrapping the pre-preg on a mandrel at a maximum pressure of up to about 50 lbs. per inch of tape width, and cooling the pre-preg.

20. The process of claim 13, wherein (b) is conducted under vacuum.

21. The process of claim 13, wherein the composite article comprises a rocket nozzle component.

22. The process of claim 13, wherein (b) is conducted in a vacuum bag.

23. The process of claim 13, wherein said arranging (a) comprises applying the curable pre-preg to a mandrel or mold at a debulk application pressure of less than 800 psig.

24. The process of claim 13, wherein said arranging (a) comprises applying the curable pre-preg to a mandrel or mold at a debulk application pressure in a range of from 40 psig to 240 psig.

25. A process for producing a rocket nozzle component, said process comprising:
   (a) arranging a curable pre-preg into the configuration of the rocket nozzle component by applying the curable pre-preg to a mandrel or mold at a debulk application pressure of less than 800 psig to produce a level of compaction sufficiently low to permit voids to be generated therein during subsequent curing of the pre-preg; and (b) conducting said subsequent curing of the pre-preg at a cure pressure of not more than about 50 psig to permit evolving gases to form voids in the pre-preg as the pre-preg cures into the rocket nozzle component.

26. The process of claim 25, wherein the cure pressure is more than 12.5 psia.

27. The process of claim 25, wherein the cure pressure is not more than atmospheric pressure.

28. The process of claim 25, wherein said curing is conducted under vacuum.

29. The process of claim 28, wherein said curing is conducted in a vacuum bag.

30. The process of claim 29, wherein the debulk application pressure is in a range of from 40 psig to 240 psig.

31. The process of claim 25, wherein the debulk application pressure is in a range of from 40 psig to 240 psig.

* * * * *